(12) United States Patent
Lee et al.

(10) Patent No.: US 7,997,555 B2
(45) Date of Patent: Aug. 16, 2011

(54) PLANAR ROTATION MECHANISM OF A SUPPORTING DEVICE

(75) Inventors: Yung-Ta Lee, Sinjhuang (TW); Yu-Tsun Hsu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 579 days.

(21) Appl. No.: 12/177,547

(22) Filed: Jul. 22, 2008

(65) Prior Publication Data

US 2009/0242722 A1  Oct. 1, 2009

(30) Foreign Application Priority Data

Mar. 27, 2008  (TW) ............................... 97110856 A (51) Int. Cl.
*F16M 11/04* (2006.01)
(52) U.S. Cl. ................. 248/371; 455/575.4; 361/679.07
(58) Field of Classification Search ............... 248/299.1, 248/371, 919, 920, 923, 176.1, 309.1, 126, 248/121, 125.9; 455/575.4; 16/239, 357, 16/358; 361/679.2, 679.22, 679.04–679.07; 211/95, 163; 40/495
See application file for complete search history.

(56) References Cited

U.S. PATENT DOCUMENTS

| | | | | |
|---|---|---|---|---|
| 2,867,839 A * | 1/1959 | Squire | ............................. | 16/358 |
| 5,923,528 A * | 7/1999 | Lee | .......................... | 361/679.07 |
| 5,941,493 A * | 8/1999 | Cheng | ............................ | 248/371 |
| 6,504,707 B2 * | 1/2003 | Agata et al. | ............... | 361/679.05 |
| 6,822,857 B2 | 11/2004 | Jung et al. | | |
| 7,082,028 B2 * | 7/2006 | Huilgol et al. | ........... | 361/679.07 |
| 7,685,680 B2 * | 3/2010 | Chien et al. | ..................... | 16/361 |
| 7,752,712 B2 * | 7/2010 | Chuan | .............................. | 16/358 |
| 7,869,840 B2 * | 1/2011 | Kim et al. | .................. | 455/575.1 |
| 2006/0223596 A1 * | 10/2006 | Hur | ............................. | 455/575.4 |
| 2008/0064452 A1 * | 3/2008 | Kim et al. | .................. | 455/575.3 |
| 2008/0188269 A1 * | 8/2008 | Jin et al. | ........................ | 455/566 |
| 2008/0242380 A1 * | 10/2008 | Kajihara et al. | ........... | 455/575.4 |
| 2010/0178963 A1 * | 7/2010 | Iwaki | ........................ | 455/575.4 |

\* cited by examiner

*Primary Examiner* — Terrell McKinnon
*Assistant Examiner* — Ingrid M Weinhold
(74) *Attorney, Agent, or Firm* — Guice Patents PLLC (57) ABSTRACT

A planar rotation mechanism of supporting device including a base seat; a supporting rack; a retaining member having a first, a second and a third guiding slots with different curvatures and lengths; and a rotating member respectively provided with a column hole with respect to initial positions of the first, the second and the third guiding slots for allowing a first, a second and a third guiding columns respectively pass through corresponding column holes and corresponding guiding slots. The guiding columns can respectively slide within the corresponding guiding slots. When the rotating member is operated with a planar rotation with an object to be supported provided in front of the rotating member, the plural guiding columns slide within the corresponding guiding slots. The object to be supported is selectively switchable between a horizontal status and a vertical status.

17 Claims, 9 Drawing Sheets

PLANAR ROTATION MECHANISM OF A SUPPORTING DEVICE

BACKGROUND OF THE INVENTION

1. Field of the Invention

The present invention relates to a planar rotation mechanism, more particularly to a planar rotation mechanism of supporting device that can be used in situations that when an object to be supported, e.g. a flat panel monitor, is operated with a planar rotation (switch from horizontal to vertical or vice versa), one corner of the lateral end of the object to be supported is firstly and horizontally moved a small distance alongside the bottom end of the object to be supported then is rotated.

2. Description of Related Art

A flat panel monitor, such as a LCD monitor, a LCD TV or a plasma TV, has advantages of light in weight, thin in thickness and no radiation. Therefore, most of CRT TVs are replaced. In order to let a flat panel monitor being uprightly disposed, a connecting unit is served to connect the flat panel monitor to a base seat, and a hinge is provided between the flat panel monitor and the connecting unit, so the flat panel monitor has a function of adjusting viewing angle.

For providing more viewing fashions of a flat panel monitor, the CHINA patent NO. 1244852C granted on Mar. 3, 2006, corresponding to the U.S. Pat. No. 6,822,857, "Monitor improved in a tilting structure" is taken as an example; the monitor includes a monitor main body, and a monitor supporting rack is provided on the back of the monitor main body, a base seat hinge provided on top of a base seat is pivotally connected to a bottom end of a connecting unit, a main hinge is provided on the top end of the connecting unit, and the main hinge is pivotally connected to a main supporting rack, the monitor supporting rack and the main supporting rack are pivotally connected via a pivotal shaft section, so the monitor main body and the monitor supporting rack can be operated with a planar rotation on the main supporting rack via the pivotal shaft section. Because there is a height between the bottom end of the monitor main body and the base seat, if the height is smaller than the distance between one bottom corner of the bottom end of the monitor main body and the pivotal shaft section, when the planar rotation is operated, the bottom corner of the bottom end of the monitor main body will hit against a surface of a desk, and this may cause damage on the monitor main body. For improving such disadvantage, the connecting unit has be to provided with a height adjusting function, so before the planar rotation is operated, the height between the monitor main body and the base seat has to be adjusted to a value larger than the distance between the bottom corner of the bottom end of the monitor main body and the pivotal shaft section, so the monitor main body can be operated with the planar rotation. A flat panel monitor's size is getting larger or has a different spec for the ratio of length and wide, such as 16:9, thus the distance between the bottom corner of the bottom end of the monitor main body and the pivotal shaft section is significantly increased, so the above mentioned planar rotation mechanism is difficult to be adopted.

The US patent publication serial No. 2006/0223596, "Rotating and sliding type mobile communication device", wherein the communication device is composed by a main body and a sliding member, the main body has a pair of guiding slots, the two guiding slots are respectively provided at two lateral sides of the center of the main body and have different curvatures and lengths. A LCD monitor is provided at the front portion of the sliding member for outputting various video/audio signals, the rear, portion of the sliding member is provided with a pair of coupling convex columns; when the pair of coupling convex columns slides alongside the pair of guiding slots, a vertical status of the sliding member is changed into a horizontal status relative to the main body. In fact, this art is applied on a cell phone, when the planar rotation is operated, the sliding member is upwardly slid along the main body and gradually tilted until the sliding member is positioned, so the sliding member is horizontally disposed on the main body. Because such art is not applied on a monitor, a height between a monitor main body and a base seat can be neglected, and during the rotating and sliding movement, the sliding member is firstly upwardly moved then rotated, there is no horizontal motion involved.

So providing an object to be supported, e.g. a flat panel monitor, with functions that when a planar rotation is operated, a bottom corner of a bottom end thereof will not hit against a surface of a desk, and during the planar rotation the flat panel monitor can be smoothly and stably moved without causing vibration is a task to be overcome.

SUMMARY OF THE INVENTION

The applicant of the present invention has devoted himself to design and commercially distribute rotation shafts and monitor supporting devices, and has a goal to overcome the disadvantage that when a monitor is operated with a planar rotation, a corner of the monitor is likely to hit against a surface of a desk. After try and error, the present invention, "Planar rotation mechanism of supporting device" is provided.

One object of the present invention is to provide a planar rotation mechanism, wherein a retaining member and a rotating member are designed with a rail fashion, so when the rotating member is operated with a planar rotation with respect to the retaining member, the planar rotation from vertical to horizontal or vice versa can be operated without considerations of a height limit between an object to be supported and a base seat and the size and the ratio of length and width of the object to be supported, so a corner of a lateral end of the object to be supported will not hit against a surface of a desk. With the specially-designed guiding slots and the combination of guiding columns and a torsion spring provided by the present invention, functions of energy saving and automatic positioning can be obtained during the planar rotation.

For achieving the object mentioned above, the present invention provides a means for a planar rotation mechanism of supporting device, includes a base seat; a supporting rack disposed on the base seat and having at least one supporting arm; a retaining member disposed on the front end of the supporting arm so a height is generated between the bottom end of the retaining member and the base seat, a position located at a top portion of a lateral side of the retaining member, a diagonal position of the retaining member and a position between the above two positions are respectively provided with a first, a second and a third guiding slots with different curvatures and lengths; and a rotating member respectively provided with a column hole with respect to the initial positions of the first, the second and the third guiding slots for allowing a first, a second and a third guiding columns respectively pass through the corresponding column holes and the corresponding guiding slots, so the guiding columns can respectively slide within the corresponding guiding slots, and the rotating member is provided in front of the retaining member; so when the rotating member is operated with a planar rotation with an object to be supported provided in front of the rotating member, the plural guiding columns slide within the corresponding guiding slots, a corner of one lateral side of the object to be supported is firstly moved a small distance alongside the bottom end of the object to be supported, then is rotated, so a horizontal status of the object to be supported is switched to a vertical status or vice versa.

The present invention provides another means for planar rotation mechanism of supporting device, includes a base seat; a supporting rack disposed on the base seat and having at least one supporting arm; a retaining member disposed on the front end of the supporting arm so a height is generated between the bottom end of the retaining member and the base seat, a position located at a top portion of a lateral side of the retaining member, a diagonal position of the retaining member and a position between the above two positions are respectively provided with a first, a second and a third guiding slots with different curvatures and lengths; a rotating member respectively provided with a column hole with respect to the initial positions of the first, the second and the third guiding slots for allowing a first, a second and a third guiding columns respectively pass through the column holes and the corresponding guiding slots, so the guiding columns can slide within the corresponding guiding slots, and the rotating member is provided in front of the retaining member; and a torsion spring which is a W-shaped resilient member, the center portion of the torsion spring is provided on the first guiding column, two outer ends thereof are fixed at two lateral positions below the first guiding slot, the center portion of the torsion spring can be moved with the first guiding column, so when the torsion spring is upwardly moved an energy saving status is obtained, when the torsion spring is downwardly moved an energy releasing status is obtained; so when the rotating member is operated with a planar rotation with an object to be supported provided in front of the rotating member, the plural guiding columns slide in the corresponding guiding slots, a corner of one lateral side of the object to be supported is firstly moved a small distance alongside the bottom end of the object to be supported, then is rotated, so a horizontal status of the object to be supported is switched to a vertical status or vice versa.

DETAILED DESCRIPTION OF THE PREFERRED EMBODIMENT

Figure 1:
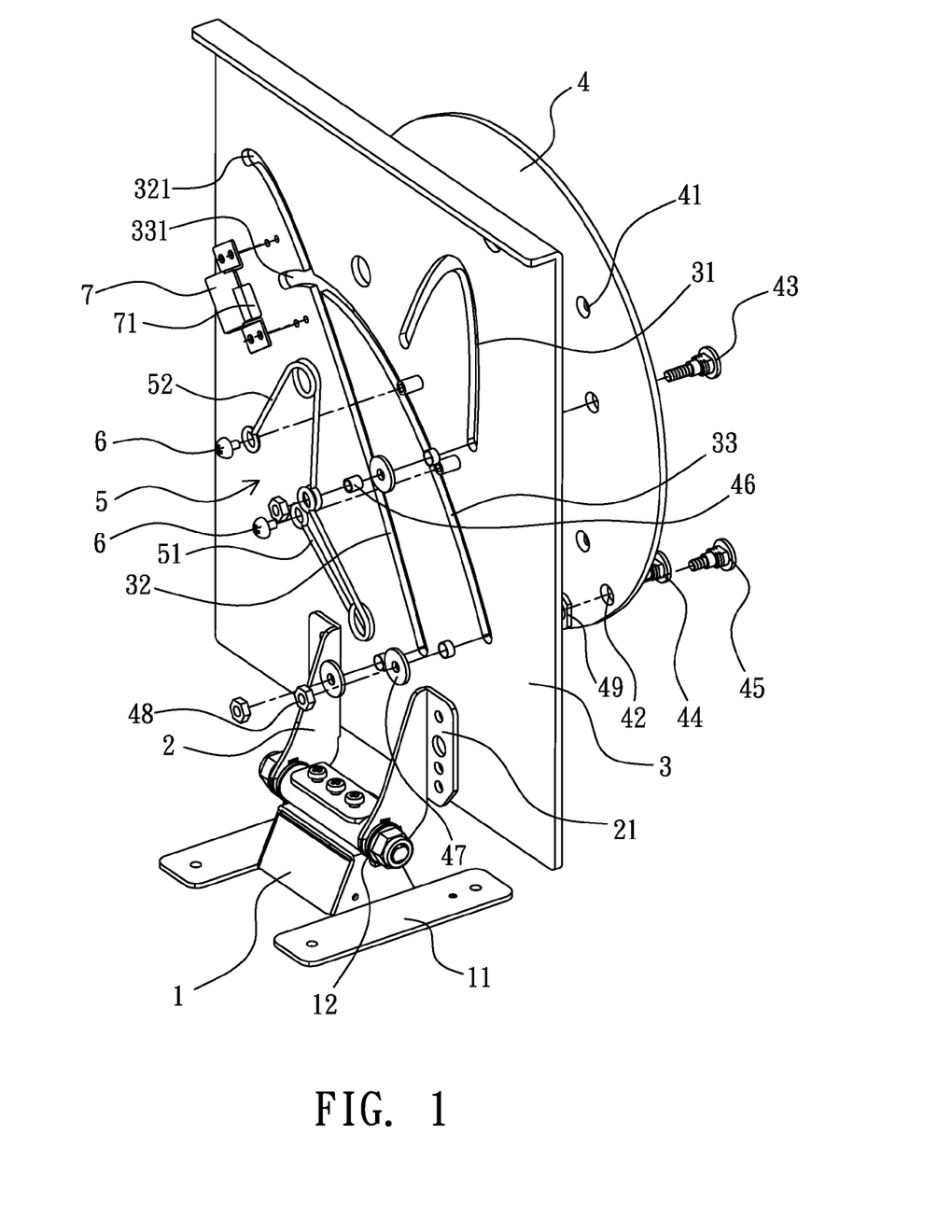
FIG. 1 is a 3D exploded view of the supporting structure provided by the present invention.
Figure 2:
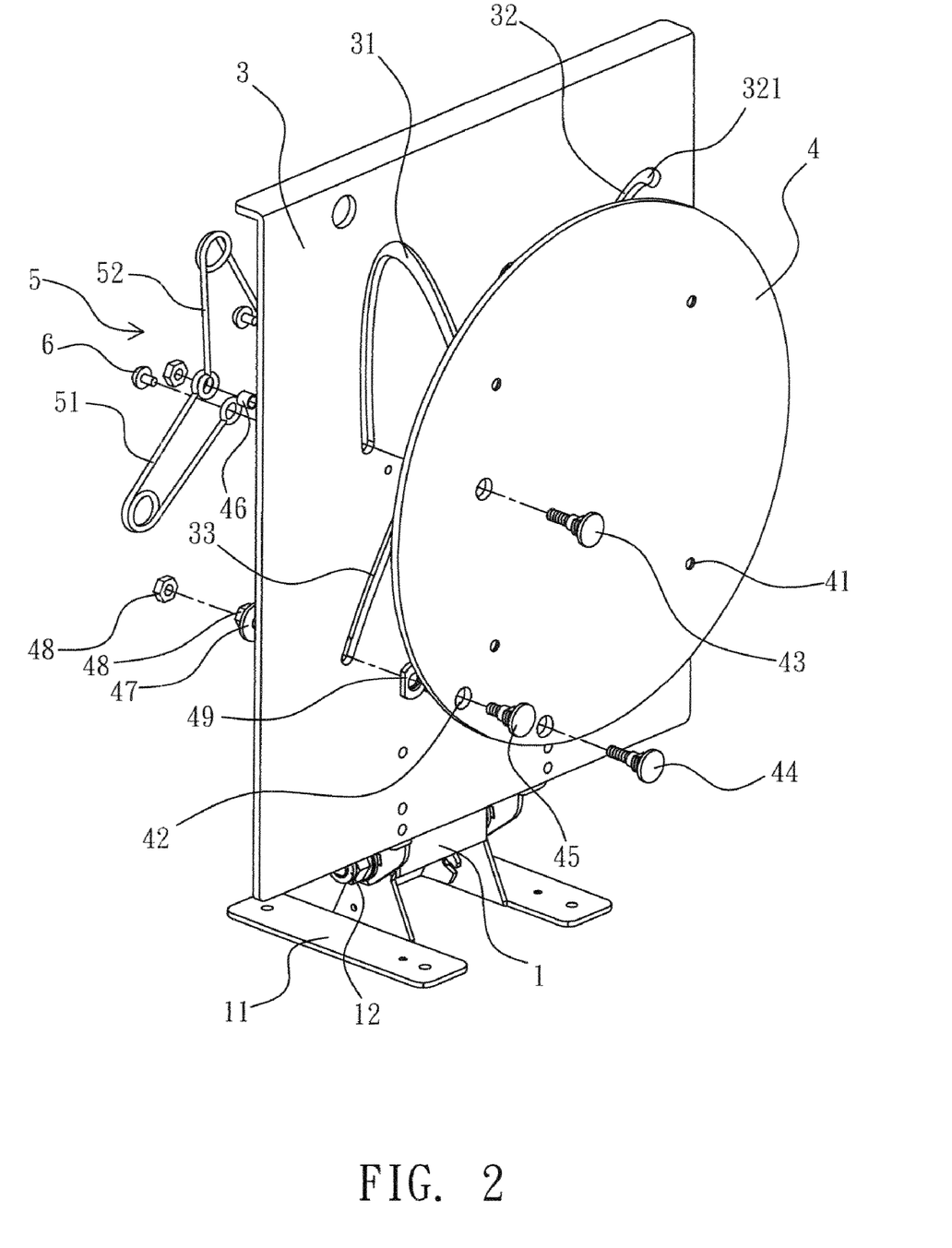
FIG. 2 is a 3D exploded view of the supporting structure provided by the present invention viewed from another angle.
Figure 3:
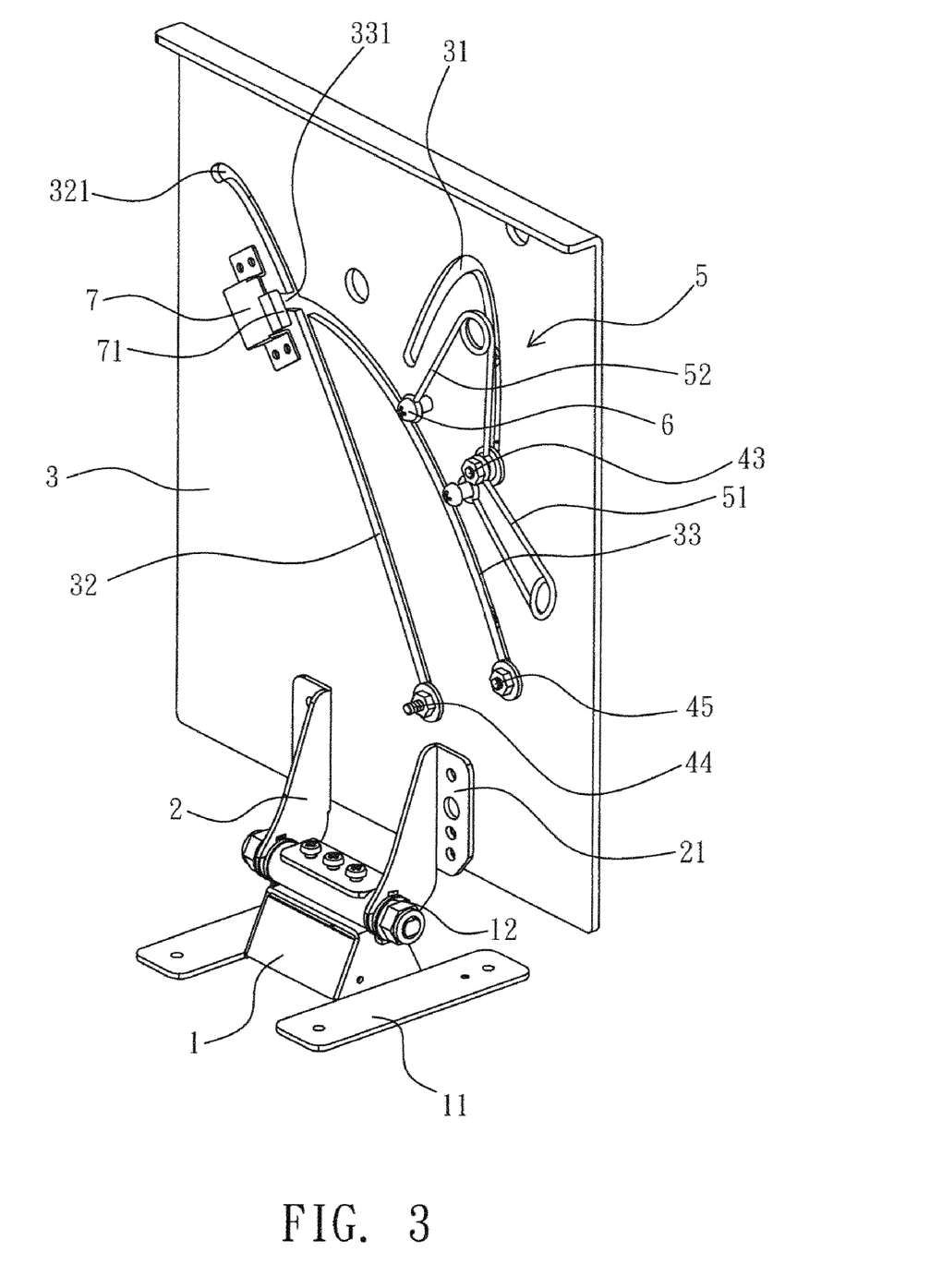
FIG. 3 is a 3D view of the supporting structure provided by the present invention after being assembled.

As shown from FIG. 1 to FIG. 3, the supporting structure provided by the present invention is composed by a base seat 1, a supporting rack 2, a retaining member 3 and a rotating member 4.

The base seat 1 is a seat member having at least one seat stand 11 for being placed on a surface of a desk. The top end of the base seat 1 is connected to the supporting rack 2 via a hinge 12, so the tilting angle of the supporting rack 2 can be adjusted with respect to the base seat 1.

The supporting rack 2 is provided on the base seat 1, the supporting rack 2 is pivotally connected to the base seat 1 via the hinge 12, or the supporting rack 2 can be directly connected to the base seat 1. The front end of the supporting rack 2 is provided with at least one supporting arm 21 for being connected to the retaining member 3, so the retaining member 3 is retained at the front end of the supporting rack 2.

Figure 4:
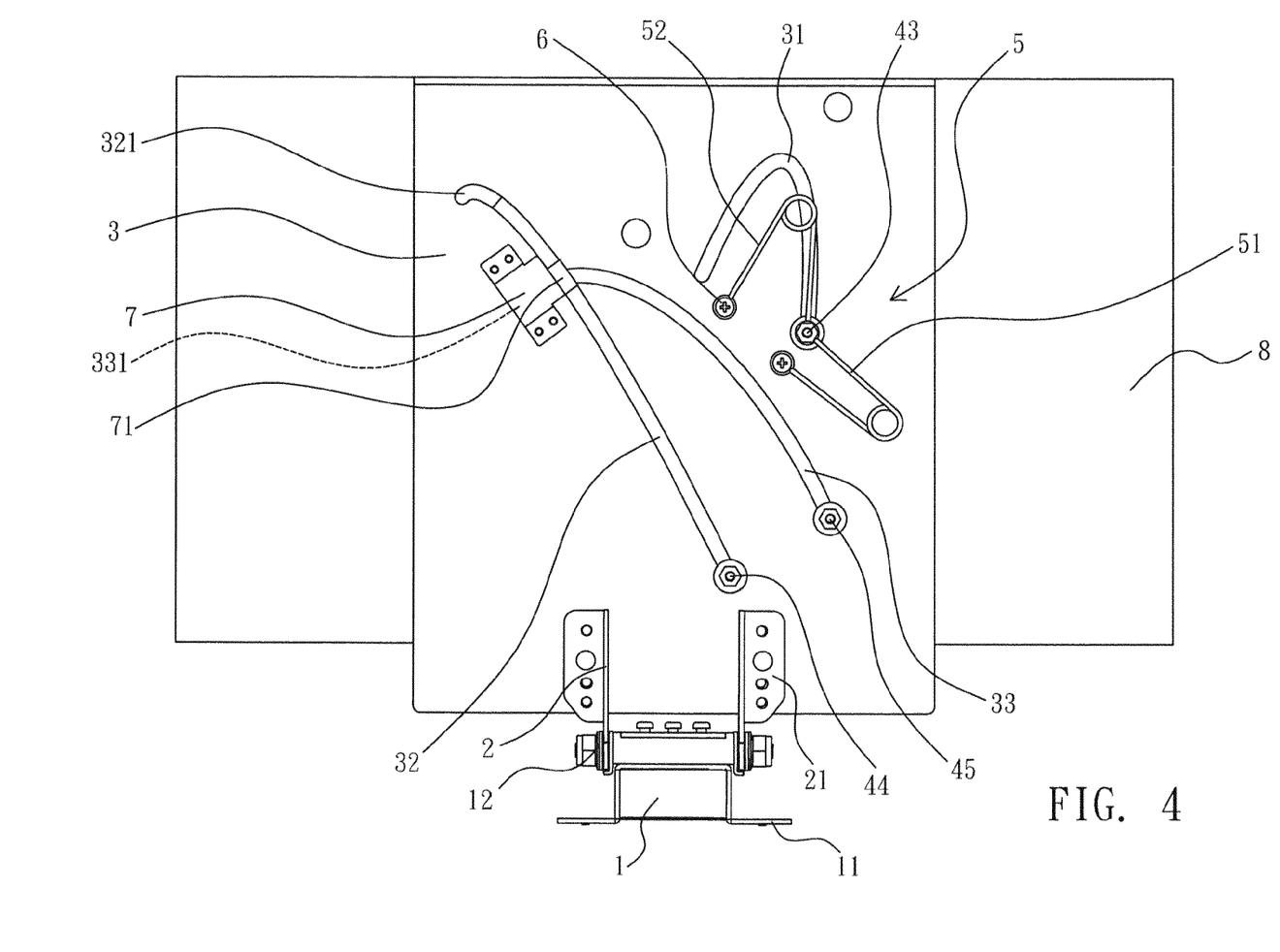
FIG. 4 to FIG. 6 are rear plane views of the flowchart of the supporting device while the object to be supported is being operated with a planar rotation.

The retaining member 3 is a sheet member disposed on the supporting arm 21 provided on the front end of the supporting rack 2, so a height is generated between the bottom end of the retaining member 3 and the seat stand 11 of the base seat 1. In order to let the rotating member 4 move with a planar rotation in front of the retaining member 3, a first guiding slot 31 and a second guiding slot 32 having different curvatures and lengths are respectively provided to the retaining member 3 at a position located at the top right portion of the retaining member 3 and at a diagonal position of the retaining member 3 with respect to the object to be supported as shown in FIG. 4. The first guiding slot 31 is in a reversed-V shape, and the second guiding slot 32 is in a long-parabolic-curve shape and the top end of the second guiding slot 32 is provided with a first positioning concave section 321 for positioning and receiving a second guiding column 44 upwardly moved to a terminal position.

Referring to FIG. 1 and FIG. 2, in order to let the rotating member 4 move smoothly and stably with a planar rotation in front of the retaining member 3, a third guiding slot 33 is provided between the first guiding slot 31 and the second guiding slot 32 and the third guiding slot 33 is in a long-parabolic-curve shape, and the top portion of the third guiding slot 33 passes through the second guiding slot 32 and intercrosses with the second guiding slot 32, and the third guiding slot 33 is provided with a second positioning concave section 331 for positioning and receiving a third guiding column 45 upwardly moved to a terminal position.

The rotating member 4 is a sheet member, the front end thereof is provided with at least one through hole 41 according to the regulation made by the Video Electronics Standards Association (VESA), for being connected to an objected to be supported, such as a flat panel monitor, so the supporting device provided by the present invention is capable of supporting the object to be supported. In order to let the rotating member 4 move with a planar rotation function, a column hole 42 is respectively provided at the right side and the bottom right side of the rotating member 4 with respect to the initial positions of the first, the second and the third guiding slots 31, 32 and 33, for allowing a first, a second and a third guiding columns 43, 44 and 45 pass through, and the guiding columns 43, 44 and 45 further pass through the corresponding guiding slots 31, 32 and 33, so the guiding columns 43, 44 and 45 can slide within the corresponding guiding slots 31, 32 and 33. For reducing friction generated by the guiding columns 43, 44 and 45 sliding within the corresponding guiding slots 31, 32 and 33, so the guiding columns 43, 44 and 45 are respectively provided with a sleeve tube 46, each of the sleeve tubes 46 can stably and smoothly slide within the corresponding guiding slots 31, 32 and 33. The free ends of the guiding columns 43, 44 and 45 are respectively provided with a pad 47 and connected to an end sealing member 48, e.g. an anti-releasing nut, so that the rotating member 4 is provided in front of the retaining member 3.

For reducing the large-area friction between the rotating member 4 and the retaining member 3 while the rotating member 4 is operated with a planar rotation, the guiding columns 43, 44 and 45 are respectively with a smaller friction pad 49 at locations between the two sheet members, so the friction area of the two sheet members is smaller and the resistance to the planar operation is therefore reduced.

For providing functions of energy saving and automatic positioning, the first guiding column 43 is connected to a center portion of a W-shaped torsion spring 5 at the initial location of the first guiding slot 31, as shown in figures, the center portion of the torsion spring 5 is pivotally provided on the sleeve tube 46 of the first guiding column 43, and the two outer ends of the torsion spring 5 are fixed at two lateral positions below the first guiding slot 31 via conventional connecting units 6, e.g. screws, so a first spring member 51 and a second spring member 52 are in an energy-saving status. As shown in figures, the torsion spring 5 is composed by the V-shaped first spring member 51 and the V-shaped second spring member 52.

The top portions of the second and the third guiding slots 32, 33 are intercrossed, in order to prevent the second guiding column 44 from laterally moving to the second positioning concave section 331 while being moved upwardly to the intercross position, and the planar rotation would be failed if the second guiding column 44 is wrongly moved into the third guiding slot 33. A means provided by the present invention for solving the above mentioned problem is to provide a position limiting member 7 at the intercross position, a Π-shaped position limiting slot 71 is formed by bending a sheet member, and the position limiting slot 71 is provided at the intercross position of the second and the third guiding slots 32, 33, and mates with the curvature of the second guiding slot 32, so when the second guiding column 44 is moved to the intercross position, the second guiding column 44 is led by the position limiting slot 71 for continuing being upwardly moved. As shown in FIG. 3, the second guiding column 44 has a length that is longer than a length of the third guiding column 45. When the second guiding column 44 reaches the intercross position, an end of the second guiding column 44 moves within the Π-shaped position limiting slot 71 and the Π-shaped position limiting slot 71 limits a movement of the second guiding column 44 to a path along the second guiding slot 32 and the third guiding column 45 moves in the third guiding slot 33 unobstructed by the position limiting member 7.

As shown in FIG. 3, which is a 3D view of the supporting structure provided by the present invention after being assembled, the retaining member 3 is provided in front of the supporting rack 2 disposed on the base seat 1, a height is generated between the bottom end of the retaining member 3 and the base seat 1, the first, the second and the third guiding columns 43, 44 and 45 of the rotating member 4 are pivotally connected to the first, the second and the third guiding slots 31, 32 and 33 at the initial positions of the first, the second and the third guiding slots 31, 32 and 33 (the bottom end of each of the guiding slots), and an object to be supporting, e.g. a flat panel monitor, passes through the through holes 41 and is horizontally connected in front of the rotating member 4 so the object to be supported and the rotating member 4 are defined as one piece.

Figure 7:
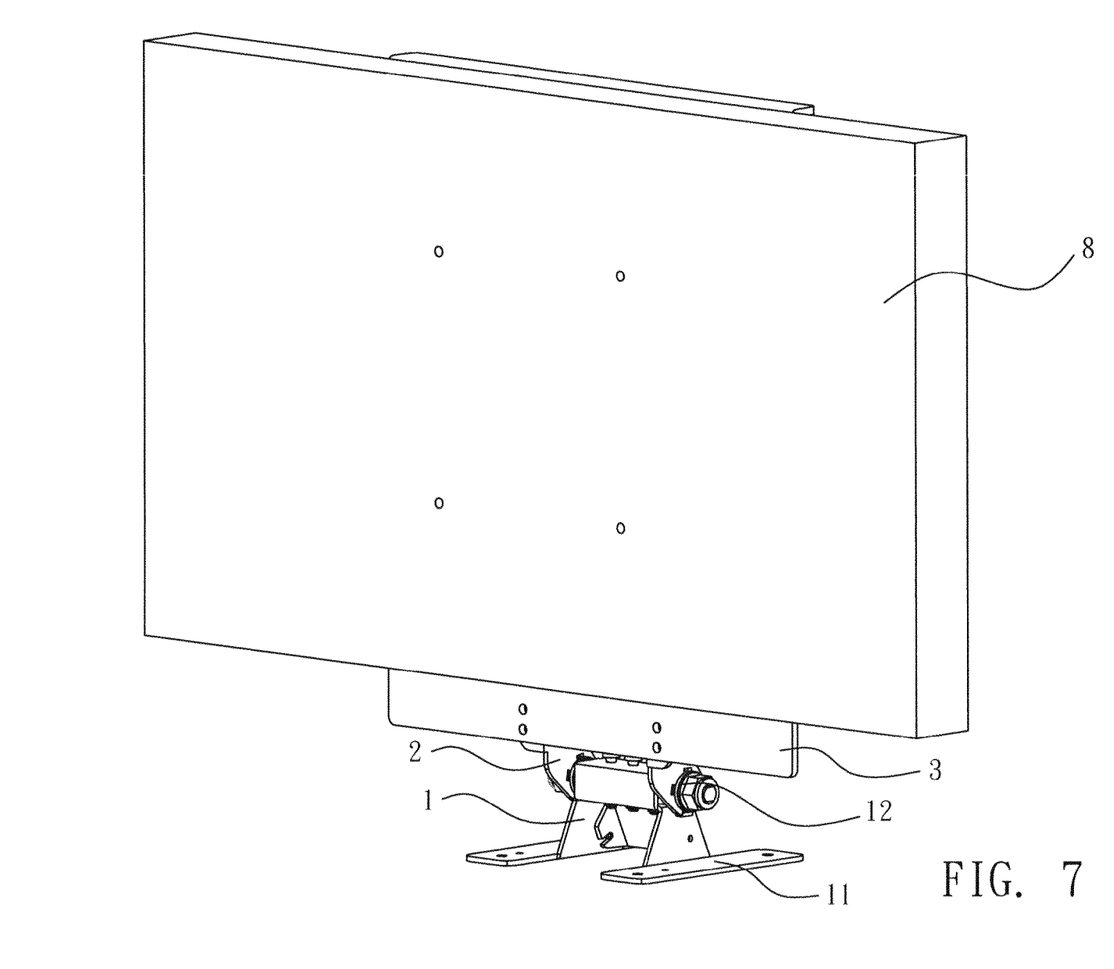
FIG. 7 to FIG. 9 are front 3D views of the flowchart of the supporting device while the object to be supported is being operated with a planar rotation.

Referring to FIG. 4 and FIG. 7, the object to be supported 8, e.g. a flat panel monitor, is horizontally provided in front of the supporting device, and the first, the second and the third guiding columns 43, 44 and 45 are disposed at the initial positions of the first, the second and the third guiding slots 31, 32 and 33 (the bottom ends). The center portion of the W-shaped torsion spring 5 is provided on the sleeve tube 46 of the first guiding column 43 and the torsion spring 5 is at an energy saving status.

Figure 5:
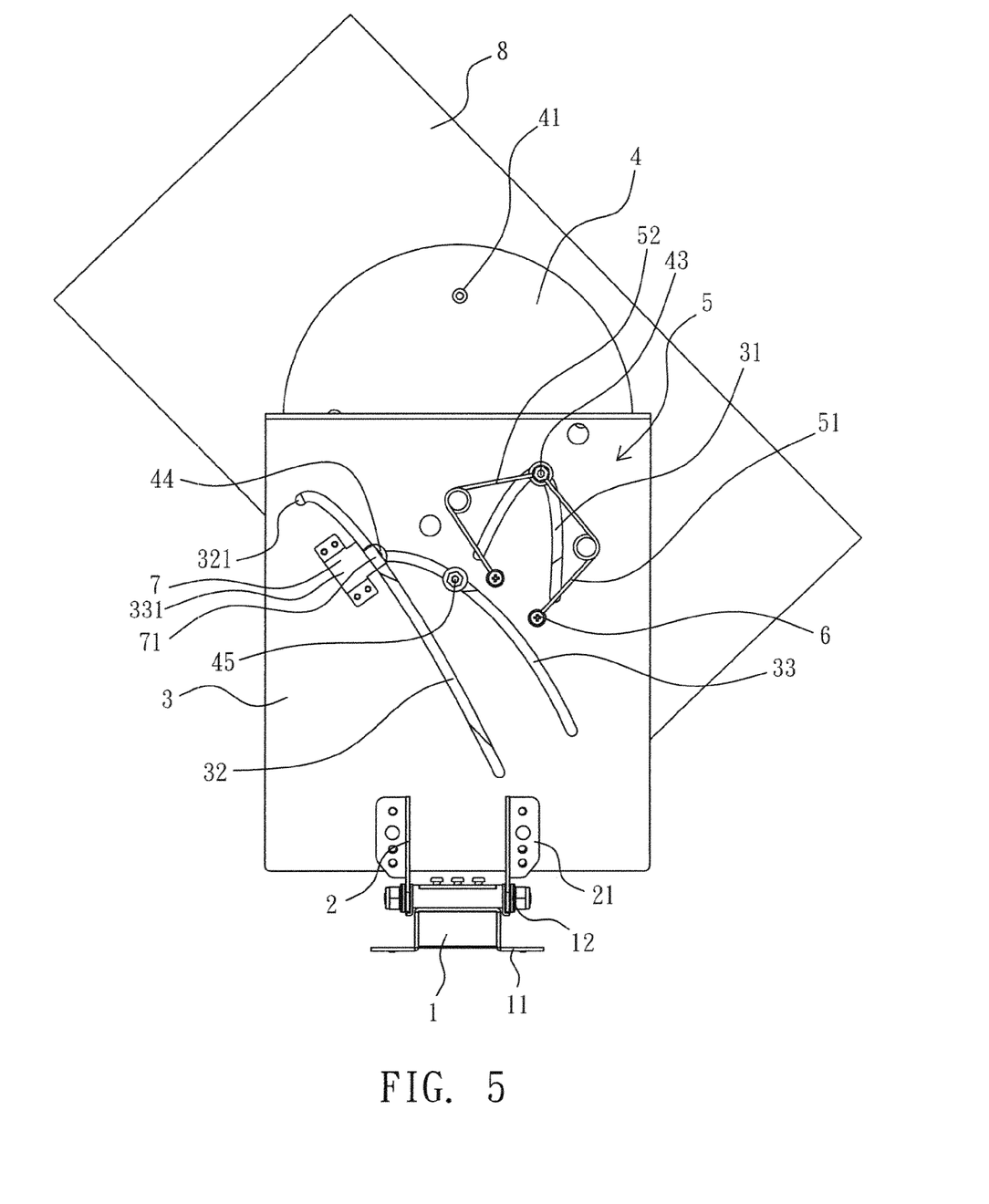
Figure 8:
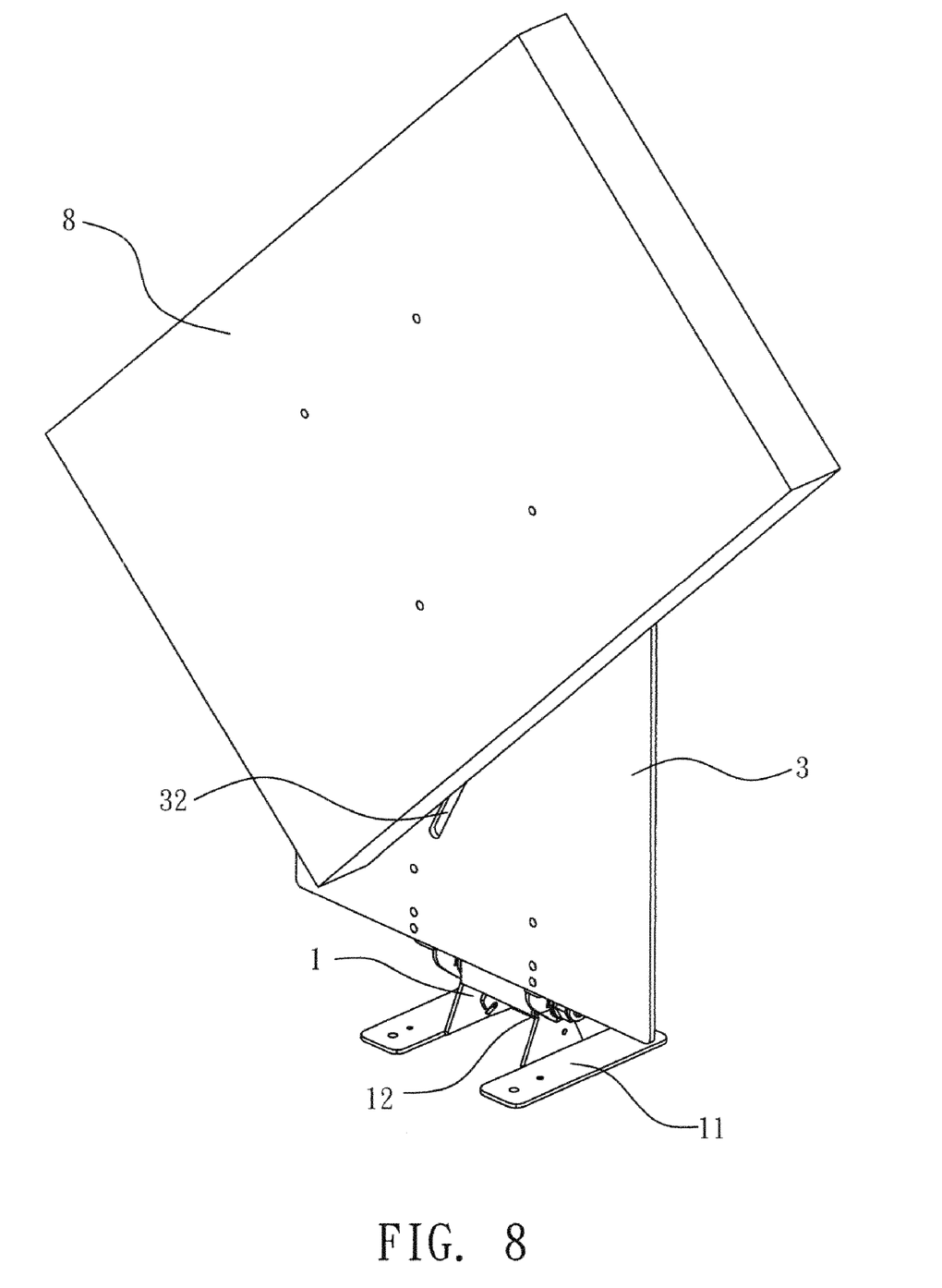

If a planar rotation is desired to be operated, a user only needs to pull the lateral side of the object to be supported 8, so the first, the second and the third guiding columns 43, 44 and 45 are upwardly moved from the initial positions of the first, the second and the third guiding slots 31, 32 and 33 and respectively alongside the first, the second and the third guiding slots 31, 32 and 33, so the bottom left corner of the object to be supported 8 is firstly moved a small distance along the retaining member 3, and then is rotated; at this moment energy is released by the first and the second spring members 51, 52 and the released energy is served as an elastic force for upwardly moving the object to be supported 8 and the rotating member 4, so energy saving can be saved. As shown in FIG. 5 and FIG. 8, when the first guiding column 43 is moved to a highest point (dead point) of the first guiding slot 31, the W-shaped torsion spring 5 is extended and is in a energy-releasing status, and the second guiding column 44 is moved to the position limiting slot 71 located at the intercross position of the second and the third guiding slots 32, 33, and the third guiding column 45 is moved about two thirds of the height of the third guiding slot 33 but does not reach the intercross position yet.

Figure 6:
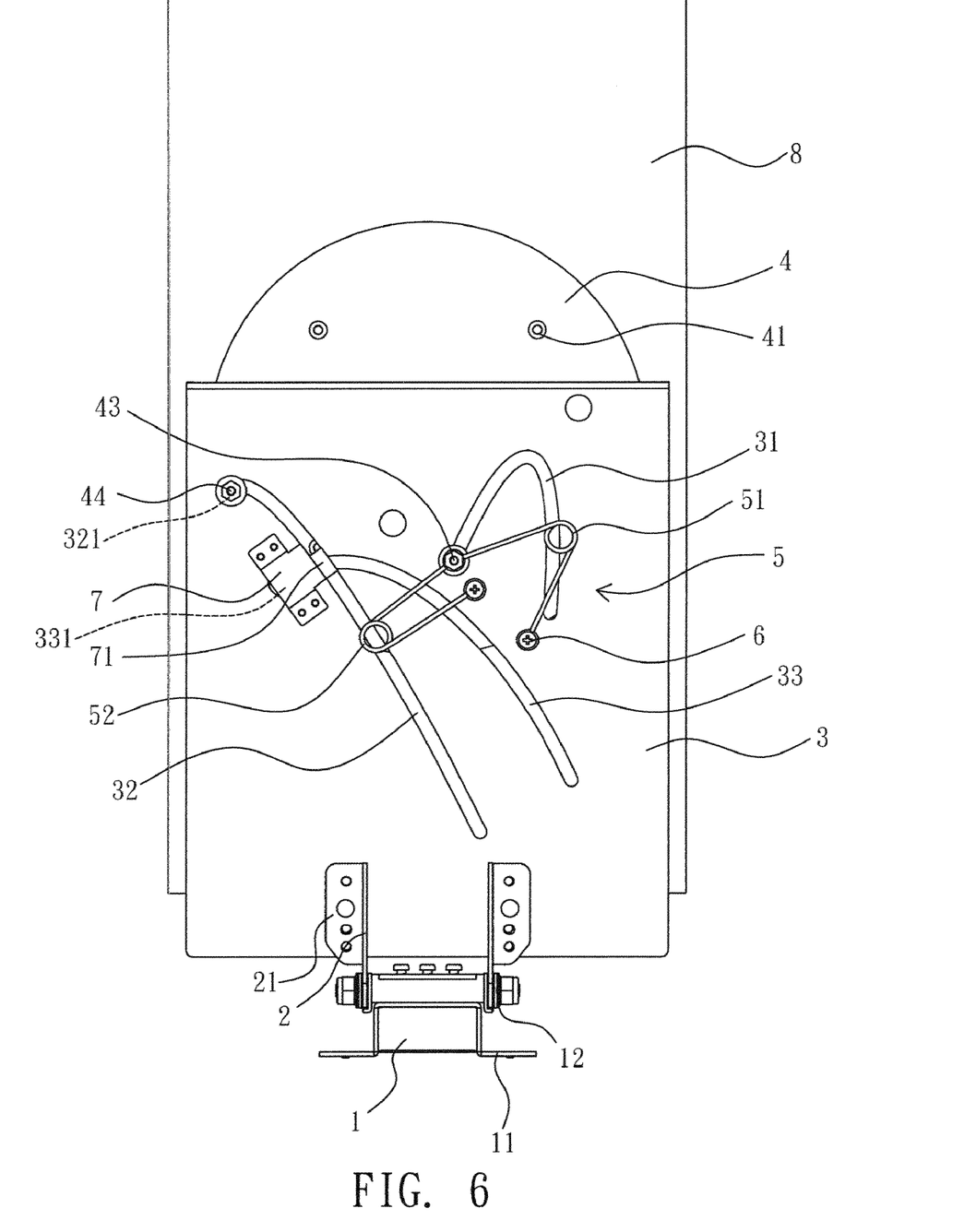
Figure 9:
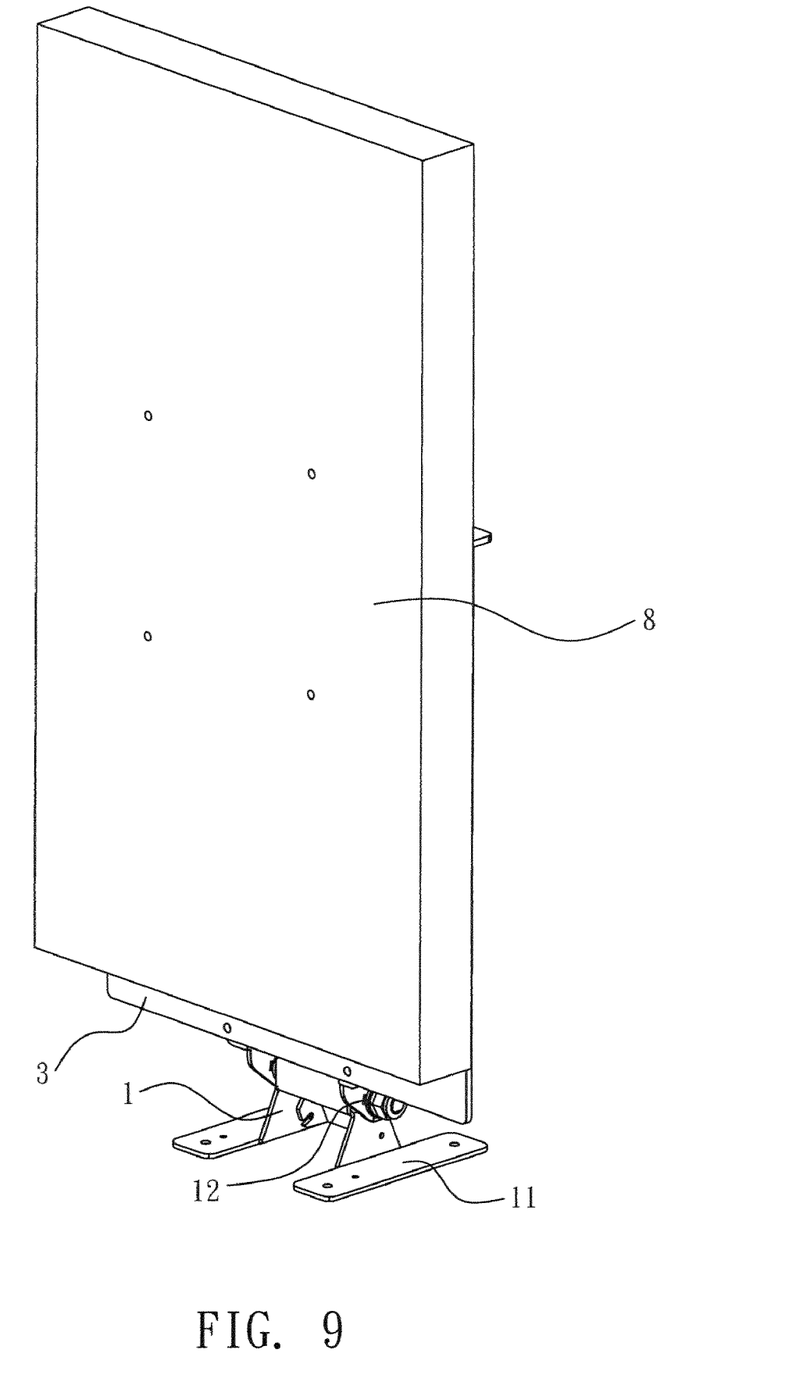

The user applies an external force to the object to be supported 8, and the first guiding column 43 passes through the highest point of the first guiding slot 31, then the first guiding column 43 moves alongside the downhill rail of the first guiding slot 31 via the natural weight of the object to be supported 8, and the W-shaped torsion spring 5 is pressed for storing energy and served to apply a rebound force to the first guiding column 43 for reducing the strength of the direct impact on the terminal point of the first guiding slot 31, and the second and the third guiding columns 44, 45 move alongside the second and the third guiding slots 32, 33 and are received in the first and the second positioning concave sections 321, 331, as shown in FIG. 6 and FIG. 9, at this moment the object to be supported 8 is switched from a horizontal status to a vertical status.

By designing the retaining member and the rotating member with a rail fashion, when the rotating member is operated with a planar rotation with respect to the retaining member, the rotating member is firstly and horizontally moved a small distance then is rotated without considerations of the height limit between the object to be supported and the base seat and the size or the ratio of length and width of the object to be supported, the rotation from a horizontal status to a vertical status or vice versa can be proceeded. By provided a plurality of friction pads between the retaining member and the rotating member for allowing the guiding columns pass through, the friction between the retaining member and the rotating member can be significantly reduced so the planar rotation is smoother. And with the specially-designed first guiding slot and the combination of the first guiding column and the torsion spring, the planar rotation is provided with functions of energy saving and automatic positioning.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A planar rotation mechanism of a supporting device, comprise:
a base seat;

a supporting rack disposed on the base seat and having at least one supporting arm;
a retaining member disposed on a front end of the supporting arm so a height is generated between a bottom end of the retaining member and the base seat; the retaining member having first, second and third guiding slots, the first guiding slot is located at a top portion of a lateral side of the retaining member, the second guiding slot is located diagonally on the retaining member, and the third guiding slot is located between the first guiding slot and the second guiding slot; the first, the second and the third guiding slots are respectively provided with different curvatures and lengths; and
a rotating member respectively provided with a column hole with respect to initial positions of the first, the second and the third guiding slots for allowing a first, a second and a third guiding column to respectively pass through the column holes and corresponding guiding slots, so the guiding columns respectively slide within the corresponding guiding slots, and the rotating member is provided in front of the retaining member;
so when the rotating member is operated with a planar rotation with an object to be supported provided in front of the rotating member, the guiding columns slide within the corresponding guiding slots, a corner of one lateral side of the object to be supported is firstly moved a small distance alongside a bottom end of the object to be supported, then is rotated, so a horizontal status of the object to be supported is switched to a vertical status or vice versa.

2. The planar rotation mechanism of a supporting device as claimed in claim 1, wherein the first guiding slot is in a reversed-V shape, and the second guiding slot and the third guiding slot are in a long-parabolic-curve shape, and a top portion of the third guiding slot passes through the second guiding slot and intercrosses with the second guiding slot.

3. The planar rotation mechanism of a supporting device as claimed in claim 2, wherein a position limiting member is provided at an intercross position of the second and the third guiding slots, and the position limiting member is provided with a position limiting slot with a downward-facing open end, and the position limiting slot is located over the second guiding slot and has a curvature mating with a curvature of the second guiding slot, so when the second guiding column moves through the intercross position, an end of the second guiding column is guided through the position limiting slot and the second guiding column moves upwardly in the second guiding slot.

4. The planar rotation mechanism of a supporting device as claimed in claim 3, wherein a top end of the second guiding slot is provided with a first positioning concave section, and the top portion of the third guiding slot is provided with a second positioning concave section for respectively positioning and receiving the second and the third guiding columns upwardly moved to a terminal point.

5. The planar rotation mechanism of a supporting device as claimed in claim 1, wherein the guiding columns between the retaining member and the rotating member are respectively provided with a friction pad.

6. The planar rotation mechanism of a supporting device as claimed in claim 1, wherein each of the guiding columns is respectively provided with a sleeve tube in the corresponding guiding slot, and each free end of the guiding columns is provided with a pad and connected to an end sealing member.

7. The planar rotation mechanism of a supporting device as claimed in claim 1, wherein a front end of the rotating member is provided with at least one through hole according to the regulation made by the Video Electronics Standards Association (VESA).

8. The planar rotation mechanism of a supporting device as claimed in claim 1, wherein the base seat and the supporting rack are pivotally connected by a hinge, so a tilting angle of the supporting rack is adjustable with respect to the base seat.

9. A planar rotation mechanism of a supporting device, comprises:
a base seat;
a supporting rack disposed on the base seat and having at least one supporting arm;
a retaining member disposed on a front end of the supporting arm so a height is generated between a bottom end of the retaining member and the base seat; the retaining member having first, second and third guiding slots, the first guiding slot is located at a top portion of a lateral side of the retaining member, the second guiding slot is located diagonally on the retaining member, and the third guiding slot is located between the first guiding slot and the second guiding slot, the first, the second and the third guiding slots are respectively provided with different curvatures and lengths;
a rotating member respectively provided with a column hole with respect to initial positions of the first, the second and the third guiding slots for allowing a first, a second and a third guiding column to respectively pass through the column holes and corresponding guiding slots, so the guiding columns slide within the corresponding guiding slots, and the rotating member is provided in front of the retaining member; and
a torsion spring which is a W-shaped resilient member, a center portion of the torsion spring is provided on the first guiding column, two outer ends thereof are fixed at two lateral positions below the first guiding slot, the center portion of the torsion spring can be moved with the first guiding column, so when the torsion spring is upwardly moved an energy saving status is obtained, when the torsion spring is downwardly moved an energy releasing status is obtained;
so when the rotating member is operated with a planar rotation with an object to be supported provided in front of the rotating member, the guiding columns slide in the corresponding guiding slots, a corner of one lateral side of the object to be supported is firstly moved a small distance alongside a bottom end of the object to be supported, then is rotated, so a horizontal status of the object to be supported is switched to a vertical status or vice versa.

10. The planar rotation mechanism of a supporting device as claimed in claim 9, wherein the torsion spring is composed by a V-shaped first spring member and a V-shaped second spring member, inner ends of the V-shaped first spring member and the V-shaped second spring member are pivotally connected to the first guiding column and each of two outer ends of the two spring members are fixed at a lateral position below the first guiding slot.

11. The planar rotation mechanism of a supporting device as claimed in claim 9, wherein the first guiding slot is in a reversed-V shape, and the second guiding slot and the third guiding slot are in a long-parabolic-curve shape, and a top portion of the third guiding slot passes through the second guiding slot and intercrosses with the second guiding slot.

12. The planar rotation mechanism of a supporting device as claimed in claim 11, wherein a position limiting member is provided at an intercross position of the second and the third guiding slots, and the position limiting member is provided with a position limiting slot with a downward-facing open end, and the position limiting slot is located over the second guiding slot and has a curvature mating with a curvature of the second guiding slot, so when the second guiding column moves through the intercross position, an end of the second guiding column is guided through the position limiting slot and the second guiding column moves upwardly in the second guiding slot.

13. The planar rotation mechanism of a supporting device as claimed in claim 12, wherein a top end of the second guiding slot is provided with a first positioning concave section, and the top portion of the third guiding slot is provided with a second positioning concave section for respectively positioning and receiving the second and the third guiding columns upwardly moved to a terminal point.

14. The planar rotation mechanism of a supporting device as claimed in claim 9, wherein the guiding columns between the retaining member and the rotating member are respectively provided with a friction pad.

15. The planar rotation mechanism of a supporting device as claimed in claim 9, wherein each of the guiding columns is provided with a sleeve tube in the corresponding guiding slot, and each free end of the guiding columns is provided with a pad and connected to an end sealing member.

16. The planar rotation mechanism of a supporting device as claimed in claim 9, wherein a front end of the rotating member is provided with at least one through hole according to the regulation made by the Video Electronics Standards Association (VESA).

17. The planar rotation mechanism of a supporting device as claimed in claim 9, wherein the base seat and the supporting rack are pivotally connected by a hinge, so a tilting angle of the supporting rack is adjustable with respect to the base seat.

\* \* \* \* \*